United States Patent
Welles, II et al.

[11] Patent Number: 5,835,319
[45] Date of Patent: Nov. 10, 1998

[54] METHOD AND APPARATUS FOR CIRCUIT BREAKING

[75] Inventors: Kenneth Brakeley Welles, II, Scotia, N.Y.; Thomas Michael Palmer, Wallingford, Conn.

[73] Assignee: General Electric Company, Schenectady, N.Y.

[21] Appl. No.: 842,630

[22] Filed: Apr. 16, 1997

[51] Int. Cl.⁶ .................................................. H02H 3/00
[52] U.S. Cl. .............................. 361/5; 361/93; 361/115; 361/62
[58] Field of Search .............................. 361/2, 5, 11, 13, 361/18, 56, 93, 115, 62, 64, 66

[56] References Cited

U.S. PATENT DOCUMENTS

| | | | |
|---|---|---|---|
| 5,121,282 | 6/1992 | White ........................................... | 361/42 |
| 5,185,684 | 2/1993 | Beihoff et al. .............................. | 361/45 |
| 5,185,685 | 2/1993 | Tennies et al. ............................. | 361/45 |
| 5,185,686 | 2/1993 | Hansen et al. .............................. | 361/45 |
| 5,185,687 | 2/1993 | Beihoff et asl. ............................ | 361/45 |
| 5,206,596 | 4/1993 | Beihoff et al. ............................. | 324/536 |
| 5,208,542 | 5/1993 | Tennies et al. ............................. | 324/544 |
| 5,223,795 | 6/1993 | Blades ......................................... | 324/536 |
| 5,307,230 | 4/1994 | MacKenzie .................................. | 361/96 |
| 5,477,150 | 12/1995 | Ham, Jr. et al. .......................... | 324/536 |
| 5,510,946 | 4/1996 | Franklin ...................................... | 361/56 |

*Primary Examiner*—Jeffrey A. Gaffin
*Assistant Examiner*—Stephen Jackson
*Attorney, Agent, or Firm*—Marvin Snyder; Douglas E. Stoner

[57] ABSTRACT

A junction box architecture includes a main circuit breaker, plurality of branch circuit breakers, and an arc detection unit. The main circuit breaker input is connected to main power supply lines, e.g., phase 1 and phase 2 power lines. The main circuit breaker output is connected to respective inputs of branch circuit breakers and to an input of the arc detection unit. The arc detection unit includes an enable output and is configured to generate an enable signal on the enable output. The enable output is coupled to enable inputs of each branch circuit breaker. When no enable signal is present on an enable input of any one branch circuit breaker, the one breaker will not trip. In general, for any one circuit breaker to trip, the breaker must simultaneously detect a high frequency current in the associated branch circuit and receive an enable signal from the arc detection unit.

16 Claims, 2 Drawing Sheets

METHOD AND APPARATUS FOR CIRCUIT BREAKING

FIELD OF THE INVENTION

This invention relates generally to arc-detecting circuit breakers and, more particularly, to performing arc-detecting circuit breaking functions with high reliability.

BACKGROUND OF THE INVENTION

A residential power circuit, e.g., for a house, typically is divided into a number of branches, and in the U.S. each power circuit branch is coupled to one of two 110 volt power lines, e.g., phase 1 or phase 2 power lines, extending to the house from a power distribution transformer. The phase lines are coupled to the respective power circuit branches in a junction box usually located inside the residence, and circuit breakers are physically located in the junction box. Each circuit breaker is electrically connected in series with one branch circuit and one phase line.

Known residential circuit breakers include a detection device which determines whether excess current is flowing in the branch circuit for longer than an allowable time period. Such excess current flow sometimes is referred to as an "overcurrent condition". In the presence of an overcurrent condition in a particular branch circuit, the associated circuit breaker disconnects the branch circuit from the phase line. The circuit breaker protects the branch circuit and facilitates identification of a fault, i.e., the fault will be located on the branch circuit associated with the tripped circuit breaker.

A conventional circuit breaker does not include an arc detection unit. Although detection of arcs is desirable to reduce the possibility of a fire being started by an arc and to protect house wiring and consumer wiring, e.g., extension cords, appliance cords and appliances, known residential arc detection units generally are expensive and inconvenient to use. More specifically, arcs generally can be identified by the high frequency content of current flowing in a branch circuit. High frequency current, e.g., current having a frequency in the range of 1 KHz to 10 MHz, can be introduced into the branch circuit through benign apparatus such as universal motors in hair driers, drills and vacuum cleaners. Such motors can produce significant high frequency energy due to arcing of the brush motor commutation. Silicon controlled rectifier lamp dimmers and advanced electronic devices can also generate high frequency energy, intentionally or unintentionally. Discriminating between actual arcing faults and benign sources of high frequency energy therefore is much more difficult than merely sensing a high frequency current. A residential arc detection unit, however, must have a low nuisance trip, i.e., false alarm, rate. Known arc detection units having the necessary low false alarm rate are expensive.

A residence can be completely protected against arc currents by placing arc detecting mechanisms in every branch breaker. When a breaker opens, the fault is partially located by identifying the interrupted branch. Even while the one branch is interrupted, power continues to be supplied to the other branch circuits. Of course, this architecture is very high in cost because accurate arc detection units are required for each branch circuit.

In an attempt to keep costs low, a residence wiring could be completely protected by having one arc detection unit coupled to the main circuit breaker, or interrupter, for the entire residence. Rather than one arc detection unit for each branch circuit breaker, which may require more than ten (10) arc detection units, only one arc detection unit is required. Such architecture is lower in cost. However, when a fault occurs, the main circuit breaker is opened and all power is cut-off to the residence with no indication of where the fault occurred. Such operation is inconvenient in that it unnecessarily cuts-off power to an entire residence and does not facilitate location of a fault.

Rather than using only one arc detection unit to trip the main breaker or separate arc detection units for each branch circuit, a residence can be partially protected by installing arc detection units in selected ones of the branch circuits. While this architecture is lower in cost as compared to having separate arc detection units for each branch circuit, some of the residence is unprotected from arcs, which is undesirable.

It would be desirable to provide complete protection for a residence from arc type faults, as well as to provide fault isolation and location. It would also be desirable to provide such complete protection at a low cost as compared to the cost associated with using sophisticated arc detection units in each branch circuit.

SUMMARY OF THE INVENTION

According to one aspect of the invention, a junction box architecture is provided which, in one embodiment, includes a main circuit breaker, a plurality of branch circuit breakers, and an arc detection unit. The main circuit breaker input is connected to main power supply lines, e.g., phase 1 and phase 2 power lines. The main circuit breaker output is connected to respective inputs of branch circuit breakers and to an input of the arc detection unit.

The arc detection unit includes an enable output and is configured to generate an enable signal on the enable output. The enable output is coupled to enable inputs of each branch circuit breaker. In general, for any one circuit breaker to trip, two conditions must be satisfied; specifically, the breaker must detect a high frequency current in the associated branch circuit and simultaneously receive an enable signal from the arc detection unit. When no enable signal is present on an enable input of one branch circuit breaker, or if the one circuit breaker does not detect a high frequency current, the one breaker will not trip.

The junction box architecture described above has many significant advantages. Particularly, in such architecture, only one high accuracy arc detection unit is required for the many circuit branches. Such structure provides high accuracy arc detection without the added cost of a dedicated arc detection unit for each branch. In addition, fault isolation and location are facilitated because a branch circuit breaker trips only when it detects a high frequency current and receives an enable signal. Therefore, power is not cut-off to the other branch circuits and the fault typically can be found on the branch circuit associated with the tripped circuit breaker.

DETAILED DESCRIPTION OF THE DRAWINGS

Figure 1:
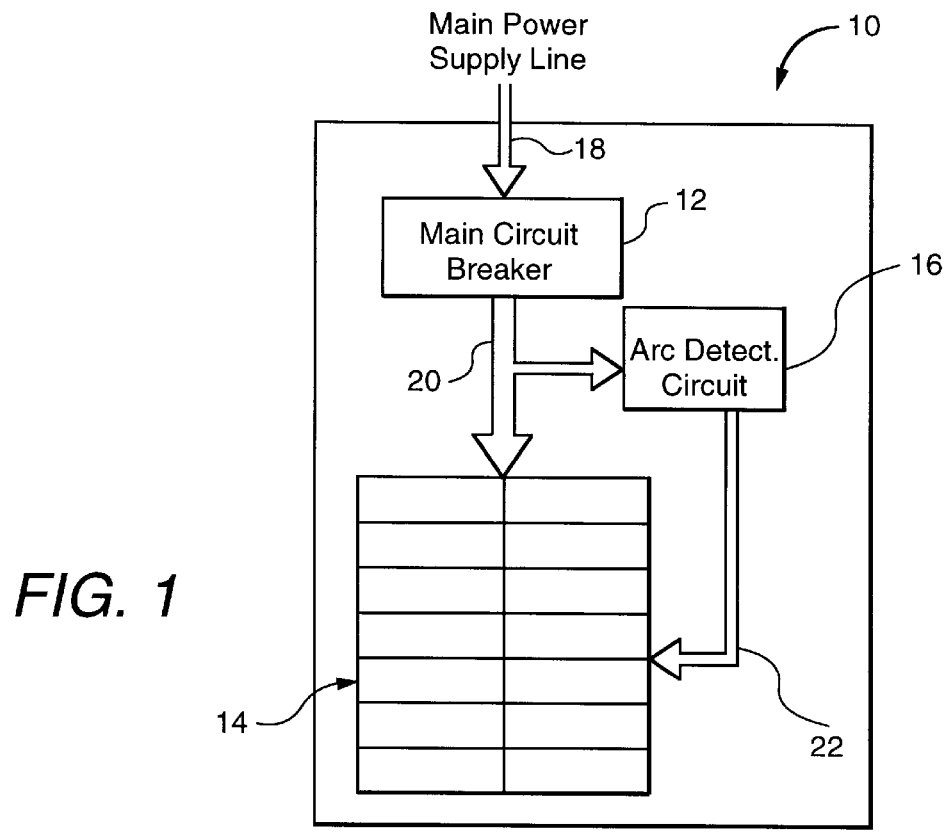
FIG. 1 is a block diagram of a junction box in accordance with one embodiment of the present invention.

FIG. 1 illustrates a junction box 10 which includes a main circuit breaker 12, a plurality of branch circuit breakers 14, and an arc detection unit 16. Main circuit breaker 12 includes an input 18 and an output 20. Main circuit breaker input 18 is connected to main power supply lines, e.g., phase 1 and phase 2 power lines (not shown). Main circuit breaker output 20 is connected to respective inputs of branch circuit breakers 14 and to an input of arc detection unit 16. Each branch circuit breaker 14 is coupled to a respective power circuit branch of, for example, a residence.

Arc detection unit 16, upon detecting existence of an arc in current received from main circuit breaker 12, is configured to generate an enable signal on an enable output line 22, coupled to enable inputs of each of branch circuit breakers 14. When no enable signal is present on an enable input of one of branch circuit breakers 14, that circuit breaker will not trip in the presence of only high frequency current if no other anomaly exists.

In general, and for any one of branch circuit breakers 14 to trip for arc suppression, two conditions must be satisfied. Specifically, such one of breakers 14 must simultaneously detect a high frequency current in the associated branch circuit and receive an enable signal from arc detection unit 16.

The architecture of junction box 10 described above provides many significant advantages. Particularly, only one high accuracy arc detection unit 16 is required for the many circuit branches. Each branch therefore has the added benefit of arc protection without the added requirement of a dedicated arc detection unit for each branch. The present invention is not directed to any particular arc detection unit since it is believed that any arc detection unit which reliably differentiates an arc from a benign source of high frequency energy on a branch circuit can be used in implementing a junction box in accordance with the architecture described above. An example of such an arc detection unit is described in U.S. Pat. No. 5,477,150.

Figure 2:
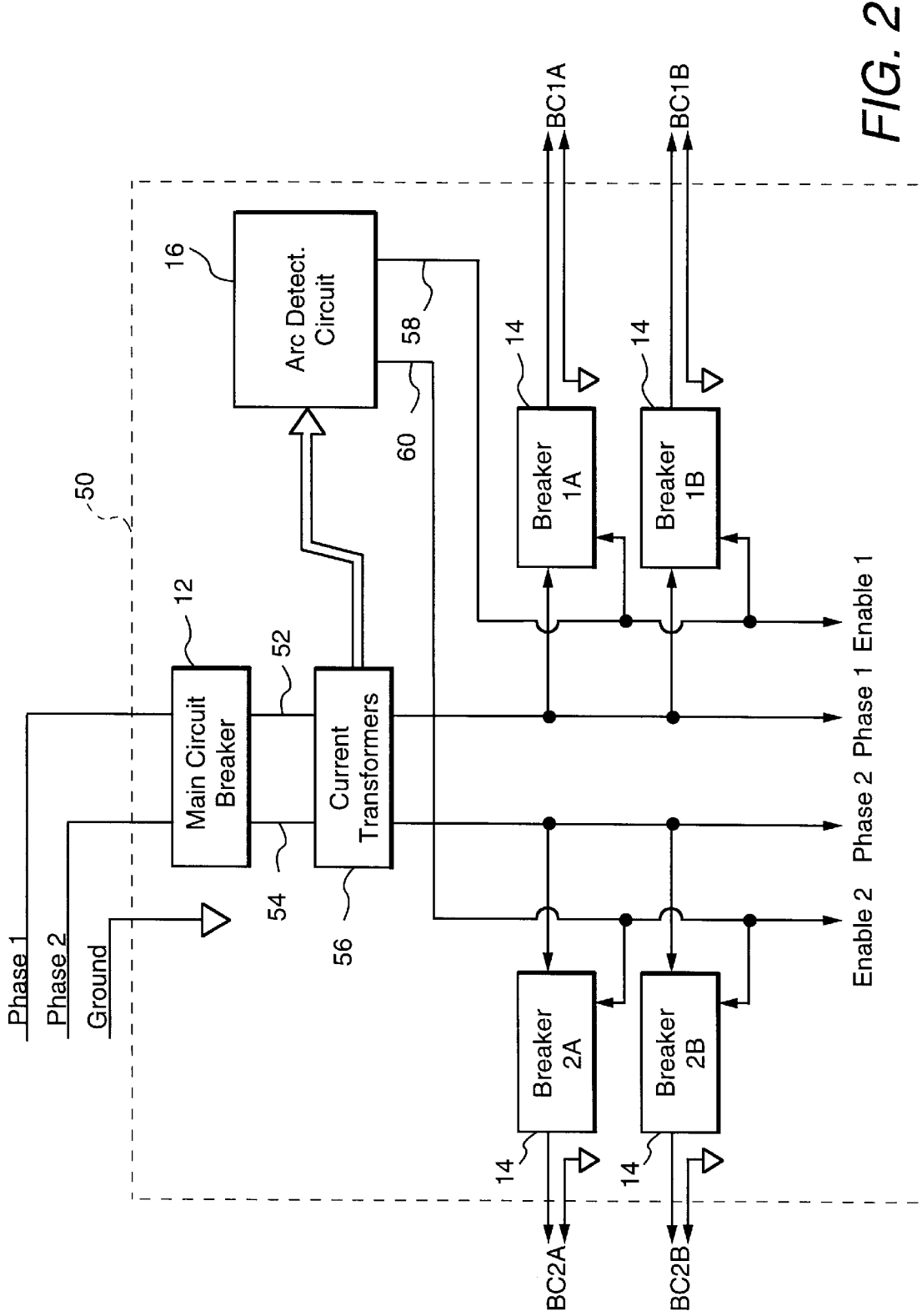
FIG. 2 is a block diagram of a junction box circuit for the junction box illustrated in FIG. 1.

FIG. 2 is a block diagram of a junction box circuit 50 for junction box 10 illustrated in FIG. 1. Specifically, with reference to FIG. 2, junction box circuit 50 is configured to be electrically connected between a first main power line, i.e., PHASE1, a second main power line, i.e., PHASE2, and a plurality of first and second branch circuits, generally designated BC1A, BC1B, etc. (for the first branch circuits) and BC2A, BC2B, etc. (for the second branch circuits).

PHASE1 and PHASE2 lines, which typically are 110 volt power distribution lines in the U.S., are electrically connected to main circuit breaker 12. A first output line 52, which is coupled to the PHASE1 line, and a second output line 54, which is coupled to the PHASE2 line, extend from main circuit breaker 12 through current transformers 56 and are connected to respective breakers 14. Specifically, first output line 52 is connected to first branch circuit breakers 1A, 1B, etc. and second output line 54 is connected to second branch circuit breakers 2A, 2B, etc.

Outputs of current transformers 56 are coupled to arc detection circuit, or unit, 16. By way of example, and in one embodiment, a first current transformer is positioned to sense current in first output line 52 and a second current transformer is positioned to sense current in second output line 54. The first and second current transformers provide separate signals to arc detection unit 16, and using such signals, arc detection unit 16 may generate an enable signal. It will be appreciated that, in the alternative, voltage sensors may be utilized instead of current transformers 56.

Arc detection unit 16 generates a first enable signal on first enable output line 58 based on current from the current transformer associated with first output line 52. Arc detection unit 16 generates a second enable signal on second enable output line 60 based on current from the current transformer associated with second output line 54.

First branch circuit breakers 1A, 1B, etc. are connected to first enable output line 58 of arc detection unit 16. Second branch circuit breakers 2A, 2B, etc. are connected to second enable output line 60 of arc detection unit 16. Each branch circuit breaker 1A, 1B, etc. and 2A, 2B, etc. is operable so that it will not trip in the presence of an arc in its respective branch circuit when no enable signal is present on its respective enable output lines 58 and 60. However, the normal overcurrent trip function remains operative even when the enable signal is not present.

In general, and as explained above, for any one branch circuit breaker 1A, 1B, etc. and 2A, 2B, etc. to trip, such breaker 1A, 1B, etc. and 2A, 2B, etc. must simultaneously detect a high frequency current in the associated respective branch circuit BC1A, BC1B, etc. or BC2A, BC2B, etc. and receive an enable signal on enable line 58 or 60 from arc detection unit 16. For example, when breaker 1B detects a high frequency current in its associated branch circuit BC1B, if arc detection unit 16 does not provide an enable signal to breaker 1B via enable line 58, breaker 1B will not trip. Such condition generally means that benign arcing is occurring on branch circuit BC1B. If, however, breaker 2A detects a high frequency current in its associated branch circuit BC2A, and if arc detection unit 16 does provide an enable signal to breaker 2A via enable line 60, breaker 2A will trip, cutting-off power to branch circuit BC2A. Such condition generally indicates that a fault occurred within branch circuit BC2A. Therefore, in addition to providing high accuracy arc detection, junction box circuit 50 also facilitates identification and location of a fault, e.g., location of a fault within a particular branch circuit.

Figure 3:
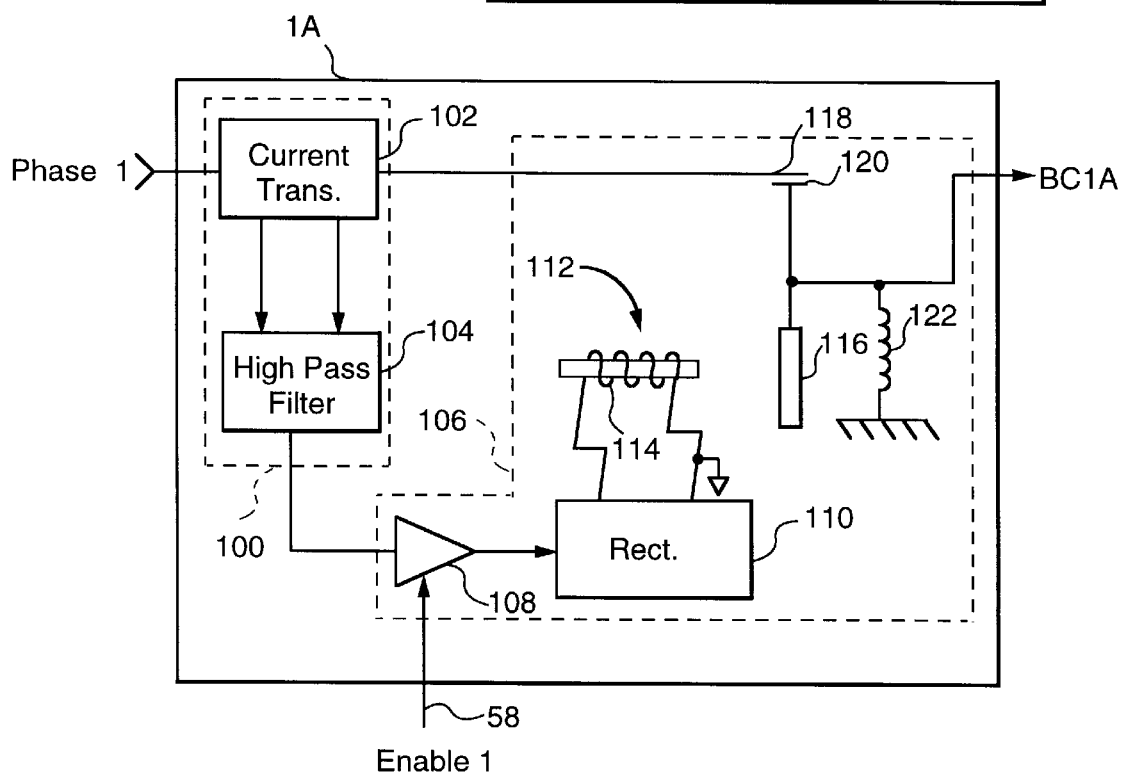
FIG. 3 is a block diagram of a circuit breaker in accordance with one embodiment of the present invention.

FIG. 3 is a block diagram of circuit breaker 1A in accordance with one embodiment of the present invention. Of course, other types of circuit breakers could be utilized in connection with the present invention, and the present invention is not limited to practice with circuit breaker 1A. Circuit breaker 1A, as illustrated in FIG. 3, is substantially similar to well known GFCI (Ground Fault Current Interrupter) breakers in common use today.

More specifically, circuit breaker 1A includes a detection unit 100 having a current transformer 102 and a high pass filter 104. As shown by way of example in FIG. 3, current transformer 102 is connected to the PHASE1 line and is also coupled to high pass filter 104 which passes signals within a predetermined frequency range, e.g., 1 KHz to 1 MHz.

Breaker 1A further includes an interrupt unit 106 having a gated amplifier 108 coupled to high pass filter 104. Gated amplifier 108 is enabled by a signal on output line 58 from arc detection unit 16 (FIG. 2). The output of gated amplifier 108 is coupled to a rectifier 110. A solenoid controlled switch 112 including a coil 114 and a magnetic arm (permanent magnet) 116 is connected to the output of rectifier 110. Interrupt unit 106 further includes a fixed contact 118 and a moveable contact 120. Fixed contact 118 is connected to the PHASE1 power line, and moveable contact 120 is connected to magnetic arm 116 of switch 112. Moveable contact 120 has a first, circuit-making condition in which it abuts fixed contact 118, and has a second, circuit-breaking condition in which moveable contact 120 is separated from fixed contact 118. Movable contact 120 is biased by a spring 122 into the first circuit making condition.

In operation, movable contact 120 is normally in the first circuit-making condition and power supplied on the PHASE1 line is provided to branch circuit BC1A via breaker 1A. Breaker 1A monitors power, or current, on the PHASE1 line and on branch circuit BC1A. Under normal conditions, no high frequency current is present on such lines. Therefore, high pass filter 104 does not provide a signal to amplifier 108, and movable contact 120 remains in the first circuit-making condition.

If a high frequency current is present on the PHASE1 line or on branch circuit BC1A, however, then high pass filter 104 passes this high frequency current to amplifier 108. However, if at this time amplifier 108 is not receiving an enabling signal on line 58 (its gating terminal) from arc detection unit 16, the amplifier does not supply an output signal to rectifier 110. Such circumstance generally indicates that the high frequency current in branch circuit BC1A originated at a benign high frequency source. However, if the high frequency current is present and, simultaneously, an enabling signal on line 58 is received by amplifier 108, then an amplified high frequency signal is provided to rectifier 110, which converts the high frequency signal into a DC signal which is supplied to coil 114 of switch 112. When solenoid controlled switch 112 is thus energized, coil 114 produces a magnetic field which couples with the magnetic field of arm 116 and drives movable contact 120 from the first, circuit-making condition to the second, circuit-breaking condition. Under such circumstances, power is cut off to branch circuit BC1A. Thus, power is cut off when a high frequency signal is detected by breaker 1A and simultaneously a harmful arc is detected by arc detection unit 16 (FIG. 2). Moveable contact 120 remains in the second, circuit-breaking condition until it is manually reset.

In one embodiment, the structure and operation of all branch circuit breakers 14 are identical to the structure and operation of circuit breaker 1A described above in connection with FIG. 3. However, circuit breakers 2A, 2B, etc. are coupled to second enable line 60 of arc detection unit 16. Therefore, an arc detected in one of second branch circuits BC2A, BC2B, etc. does not affect operation of first branch circuits BC1A, BC1B, etc. Similarly, an arc detected in one of first branch circuits BC1A, BC1B, etc. does not affect operation of second branch circuits BC2A, BC2B, etc.

The above described junction box architecture provides complete protection for a residence from arc type faults, including fault isolation and location, at a low cost compared to the cost of using sophisticated arc detection units in each branch circuit.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A circuit breaker apparatus, comprising:
   an arc detection unit for receiving a signal representative of current in a power line and configured to generate an enable signal upon identification of a predetermined condition from the current representative signal; and
   a plurality of branch circuit breakers, each of said branch circuit breakers coupled to said arc detection unit and being enabled to be tripped only upon receipt of the enable signal from said arc detection unit.

2. A circuit breaker apparatus in accordance with claim 1 and further comprising a main circuit breaker for connection to the power line and having an output coupled to respective inputs of said branch circuit breakers and to an input of said arc detection unit.

3. A circuit breaker apparatus in accordance with claim 1 wherein each of said branch circuit breakers includes a detection unit comprising a current transformer and a high pass filter coupled to said current transformer, said high pass filter configured to only pass a high frequency signal within a predetermined frequency range.

4. A circuit breaker apparatus in accordance with claim 2 wherein said predetermined frequency range is 1 KHz to 10 MHz.

5. A circuit breaker apparatus in accordance with claim 2 wherein each of said branch circuit breakers further includes an interrupt unit comprising a gated amplifier coupled to said high pass filter, said gated amplifier including a gating terminal for receiving said enable signal from said arc detection unit.

6. A circuit breaker apparatus in accordance with claim 5 wherein said interrupt unit further comprises a fixed contact and a solenoid controlled moveable contact, said fixed contact being coupled to the power line, said moveable contact being adapted to be coupled to an output power line for the respective branch circuit, said moveable contact being normally biased into a first, circuit-making condition in which said moveable contact abuts said fixed contact and having a second, circuit-breaking condition in which said moveable contact is separated from said fixed contact.

7. A circuit breaker apparatus in accordance with claim 6 wherein said interrupt unit further comprises a solenoid coupled to an output of said gated amplifier and positioned so that when said solenoid is energized, said movable contact is moved to said second, circuit-breaking condition.

8. A circuit breaker apparatus in accordance with claim 7 wherein said interrupt unit further comprises a rectifier coupling said gated amplifier output to said solenoid.

9. A circuit breaker apparatus configured to be electrically connected between a first main power line and a plurality of first branch circuits, said circuit breaker apparatus comprising:
   a main circuit breaker including a first input for connection to the first main power line, and a first output for supplying power from the first main power line;
   a plurality of first branch circuit breakers, each of said first branch circuit breakers including an enable input and capable of being tripped only when an enable signal is present on its enable input, each of said first branch circuit breakers further including an input electrically connected to said main circuit breaker first output and an output electrically connected to a respective one of the first branch circuits; and
   an arc detection unit electrically connected to said first output of said main circuit breaker and including a first enable output connected to said enable inputs of said first branch circuit breakers.

10. A circuit breaker apparatus in accordance with claim 9 further configured to be connected between a second main power line and a plurality of second branch circuits and wherein said main circuit breaker comprises a second input for connection to the second main power line, and a second output for supplying power from the second main power line, a plurality of second branch circuit breakers, each of said second branch circuit breakers comprising an enable input and capable of being tripped only when an enable signal is present on its enable input, each of said second branch circuit breakers further comprising an input electrically connected to said main circuit breaker second output and an output electrically connected to a respective one of the second branch circuits, said arc detection unit further comprising a second enable output connected to said enable inputs of said second branch circuit breakers.

11. A circuit breaker apparatus in accordance with claim 9 wherein each of said first branch circuit breakers further comprises a current transformer and an interrupt unit configured to stop supply of power to an associated first branch circuit upon detection of a predetermined condition on the power line, said interrupt unit comprising a high pass filter coupled to said current transformer, said high pass filter configured to only pass a high frequency signal within a predetermined frequency range, said interrupt unit further comprising a gated amplifier coupled to said high pass filter, said gated amplifier having a gate terminal coupled to said enable output of said arc detection unit.

12. A circuit breaker in accordance with claim 11 wherein said interrupt unit further comprises a fixed contact and a solenoid controlled moveable contact, said fixed contact being adapted to be energized from the first main power line, said moveable contact being connected to an output power line for the respective branch circuit, said moveable contact being normally biased into a first, circuit-making condition in which said moveable contact abuts said fixed contact and having a second, circuit-breaking condition in which said moveable contact is separated from said fixed contact, said interrupt unit further comprising a solenoid coupled to an output of said gated amplifier and positioned so that when said solenoid is energized, said movable contact is in said second, circuit-breaking condition.

13. A method for operating a plurality of first circuit breakers electrically connected between a first main power supply line and a plurality of first branch circuits, each of the first circuit breakers being connected to control supply of power from the first main power supply line to a respective one of the first branch circuits, each of the first circuit breakers including an enable input for receiving an enable signal from an arc detection unit, said method comprising the steps of:

operating each of the first circuit breakers to monitor power in the associated first branch circuit;

providing an enable signal from the arc detection unit to the enable inputs of the first circuit breakers upon detection of a fault indicative of an arc in at least one of the first branch circuits; and causing a trip of whatever one of the first circuit breakers detects a high frequency current signal within a predetermined range in the associated first branch circuit in the presence of the enable signal at its enable input.

14. A method in accordance with claim 13 wherein detection of the high frequency current signal within a predetermined range in the associated first branch circuit comprises the step of high pass filtering the monitored power in the associated first branch circuit.

15. A method in accordance with claim 13 wherein the predetermined frequency range of the detected high frequency current signal is 1 KHz to 10 MHz.

16. A method in accordance with claim 13 wherein a plurality of second circuit breakers are electrically connected between a second main power supply line and a plurality of second branch circuits, each of the second circuit breakers being connected to control supply of power from the second main power supply line to a respective one of the second branch circuits, each of the second circuit breakers including an enable input for receiving an enable signal from the arc detection unit, said method further comprising the steps of:

operating each of the second circuit breakers to monitor power in the associated second branch circuit;

providing the enable signal from the arc detection unit to the enable inputs of the second circuit breakers upon detection of a fault indicative of an arc in at least one of the second branch circuits; and causing a trip of whatever one of the second circuit breakers detects a high frequency current signal within a predetermined range in the associated second branch circuit in the presence of the enable signal at its enable input.

* * * * *